United States Patent Office 3,234,178
Patented Feb. 8, 1966

3,234,178
CONDENSATION CATALYSTS AND PROCESS
Ralph F. Sellers, Middlebush, N.J., assignor to Union Carbide Corporation, a corporation of New York
No Drawing. Continuation of abandoned application Ser. No. 727,786, Apr. 11, 1958. This application June 16, 1960, Ser. No. 36,481
7 Claims. (Cl. 260—46.5)

This is a continuation of application Serial No. 727,786, filed April 11, 1958, now abandoned.

This invention relates to a process for producing novel condensation catalysts useful in the preparation of polysiloxane resins. More particularly this invention relates to novel compositions containing N-substituted amino-alkyl-silicon compounds and to processes for their production.

The present invention is based on the discovery that novel compositions useful as condensation catalysts in preparing polysiloxane resins can be produced by a process that includes forming a reactive mixture of an aminoalkylsilicon compound containing the group represented by the formula:

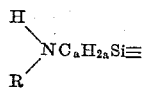

wherein R is a member selected from the group consisting of hydrogen, monovalent hydrocarbon groups, such as alkyl, aryl, aralkyl, alkaryl groups, and the like, and $-C_aH_{2a}Si\equiv$ groups that are attached to the nitrogen atom of the aminoalkylsilyl grouping through a carbon to nitrogen linkage and $a$ is an integer of from 1 to 15, and preferably 3 or 4, with a mono-epoxide in an organic solvent and maintaining the mixture at a temperature at which the compound containing the aminoalkylsilyl grouping and the monoepoxide react to produce the novel compositions of this invention. All silicon atoms of the aminoalkylsilicon compound are connected to 0 to 3 oxygen atoms which in turn are connected to no other elements than carbon of a hydrocarbon group, hydrogen and silicon and remaining unfilled valences of said silicon atoms are satisfied by hydrocarbon groups. The compositions produced by this process are solutions of the reaction product of the above-described aminoalkylsilicon compound and the monoepoxide in organic solvents such as the low molecular weight aliphatic alcohols, alicyclic alcohols, the low molecular weight ketones, the ethers and the aromatic hydrocarbons.

According to my studies the reaction is equally applicable to all organosilicon compounds which contain the aminoalkylsilyl group depicted above. Most suitable for use in my process are the aminoalkylalkoxysilanes and the aminoalkylpolysiloxanes, including copolymeric materials which contain both aminoalkylsiloxane and hydrocarbon siloxane units. Typical of the aminoalkylalkoxysilanes which I can employ as my organosilicon starting materials are those compounds represented by the formula:

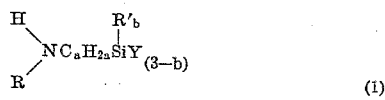

wherein R and $a$ are as previously defined, R' is a monovalent hydrocarbon group. Y is an alkoxy group such as methoxy, ethoxy, propoxy and the like; and $b$ is an integer having a value of from 0 to 3, and preferably a value of from 0 to 1. Illustrative of such aminoalkylalkoxysilanes are aminomethyltriethoxysilane, gamma-aminopropyltrimethylsilane, gamma - aminopropyltriethoxysilane, gamma-aminopropyltripropoxysilane, gamma-aminopropylmethyldiethoxysilane, gamma-aminopropylethyldiethoxysilane, gamma - aminopropylphenyldiethoxysilane, delta - aminobutyltriethoxysilane, delta-aminobutylmethyldiethoxysilane, delta - aminobutylethyldiethoxysilane, delta - aminobutylphenyldiethoxysilane, bis-(gamma-triethoxysilylpropyl)-amine and the like.

Typical of the aminoalkylpolysiloxanes suitable for use as my organosilicon starting materials are those polysiloxanes which contain the unit:

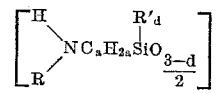

wherein R, R', and $a$ are as previously defined, and $d$ is an integer from 0 to 2. Such polysiloxanes are prepared by the hydrolysis and condensation of those aminoalkylalkoxysilanes described above or by the cohydrolysis and cocondensation of such aminoalkylalkoxysilanes with other hydrolyzable silanes and include: aminoalkylsiloxane units of the trifunctional, difunctional and monofunctional type with respect to silicon, singly or in any combination.

The copolymeric aminoalkylpolysiloxanes which may be employed as starting materials can be depicted as containing both of the units:

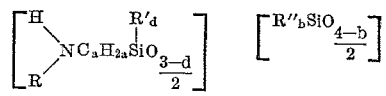

wherein R, R', $a$, $b$ and $d$ are as previously defined and R" is a monovalent hydrocarbon radical. These copolymeric polysiloxanes include those containing siloxane units of the trifunctional, difunctional and monofunctional type, with respect to silicon, singly or in any combination of such siloxane units.

In general, a monoepoxide or any compound containing only one epoxy group i.e.,

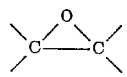

may be used as a starting material in this invention. By the term "epoxy," as used herein to designate a group or compound, is meant a group composed of or a compound containing oxirane oxygen attached to two vicinal carbon atoms. Suitable monoepoxides are: the linear olefin oxides such as ethylene oxide, propylene oxide, butadiene monoxide, diisobutylene monoxide, etc.; the substituted olefin oxides such as styrene oxide, 2,3-epoxypropyl benzene, etc.; the cyclic olefin oxides such as epoxycyclopentane, 2,3-epoxy-cyclopentene, etc.; the epoxy alcohols such as glycidol, 2,3-epoxycyclopentanol, 3,4-epoxy-6-methylcyclohexylmethanol, etc.; the glycidyl ethers such as phenyl glycidyl ether, benzyl glycidyl ether, butyl glycidyl ether, the glycidyl esters such as glycidyl acetate, etc.; and the like.

The relative amounts of the aminoalkylsilicon compound and the monoepoxide used as starting materials are not narrowly critical. The reaction theoretically requires one epoxy equivalent for each equivalent of amino hydrogen to be replaced in the aminoalkylsilicon compound. However, lesser or greater amounts can be used.

The temperature used in producing the compositions of this invention is not narrowly critical, and will vary depending on the particular reaction mixture that is being employed. Temperatures below about 0° C. are not preferred because the reaction may be too sluggish. Temperatures much above about 200° C. are not generally preferred as impractical or to avoid any undesirable side reactions which may in some instances occur at such temperatures. If desired, the reaction can be conducted in a closed vessel at reduced or superatmospheric pressure.

Shorter reaction times are experienced when a low molecular weight aliphatic alcohol and/or a small amount of water is present in the reaction. The alcohol and water function as catalysts to increase the rate of reaction and when employed permit the reaction to be more efficiently carried out at low temperatures and pressures, e.g. room temperature and atmospheric pressure.

The reaction is carried out in an organic solvent. Illustrative of suitable organic solvents are the low molecular weight aliphatic alcohols, such as methanol, ethanol, propanol and the like; alicyclic alcohols, such as cyclopentanol, cyclohexanol and the like; low molecular weight ketones, such as acetone, methyl ethyl ketone and the like; ethers, such as isopropyl ether, dioxane and the like; and aromatic hydrocarbons such as benzene, toluene and the like. Any organic solvent which is non-reactive with and a solvent for the monoepoxide and aminoalkylsilicon compound starting materials can be employed. By the term "low molecular weight," as used herein to designate the aliphatic alcohol solvent or catalyst and the ketone solvent, is meant a compound having from 1 to 6 carbon atoms. When a low molecular weight aliphatic alcohol is employed as a solvent in my process, it performs the dual function of a catalyst as well.

The compositions of this invention are characterized as being solutions in an organic solvent of the reaction products of a monoepoxide and the aminoalkylsilicon compound. The compositions are believed to be complex mixtures of various types of addition and rearrangement compounds of the reaction of the monoepoxide and aminoalkylsilicon compounds. The exact identity of each chemical compound in the reaction product defies determination since procedures employed in isolating and identifying these compounds undoubtedly cause changes in the chemical structure and make-up of said compounds. Surprisingly, it has been found that my compositions per se without further treatment are remarkably effective as condensation catalysts in making polysiloxane resins. The compositions not only catalyze condensations of siloxane hydrolyzates but also cause the enhancement of various properties of resins made therewith to an extent not heretofore experienced with other known condensation catalysts.

Organosiloxane polymers and copolymers are produced in accordance with the many methods known in the art by the hydrolysis and subsequent condensation of a hydrolyzable silane or a mixture of hydrolyzable silanes, said silanes containing from 1 to 4 hydrolyzable groups bonded to the silicon atom. Illustrative hydrolyzable silanes used in making polysiloxane resins are represented by the formula:

$$R'''_n SiX_{4-n}$$

wherein $R'''$ is a monovalent hydrocarbon group or halogen-substituted hydrocarbon group. X is a hydrolyzable group, e.g., halogen or alkoxy, and $n$ is an integer having a value from 0 to 3. The average value of $n$ for the mixture of hydrolyzable silanes can have a value of from about 0.95 to about 2.25; and when thermosetting products are desired, from about 0.95 to about 1.6. Illustrative of hydrolyzable silanes are ethyltrichlorosilane, dimethyldichlorosilane, phenyltrichlorosilane, methylphenyldichlorosilane, methyltriethoxysilane, dimethyldiethoxysilane, tetrachlorosilane, methylphenyldiethoxysilane, gamma-chloropropyltrichlorosilane, beta-methyl-gamma-chloropropyltrichlorosilane, chlorophenyltrichlorosilane and dichlorophenyltrichlorosilane, as well as mixtures thereof. The reaction mixture of hydrolyzable silanes can be prepared from purified monomers or monomer mixtures, or from commercially available materials.

In one method of carrying out the hydrolysis, the mixture of functional silanes, e.g., a mixture of chlorosilanes, is slowly added at a temperature below about 30° C. to an agitated slurry of an acid acceptor such as an alkali or alkaline earth metal carbonate or bicarbonate, which is suspended in an organic solvent such as ether, toluene or acetone and not more than about 2 percent by weight of water. The mixture is then agitated until hydrolysis is substantially completed, i.e., until the pH of the reaction mixture is about 6 to 7. After hydrolysis is completed, the slurry is filtered to remove the insoluble salts and the filter cake is washed with additional fresh solvent. Then a catalytic amount of the composition of this invention, i.e., an amount sufficient to increase the pH of the reaction mixtures to about 7.5 to 8.5, is added to the combined filtrates and partial condensation is effected by heating for a short time. Finally the solvents may be distilled off.

In another method, the mixture of hydrolyzable silanes is added to a vigorously agitated two phase solvent system consisting of water and an organic solvent immiscible in water, such as toluene, petroleum ether or isopropyl ether, at a reaction temperature below about 50° C. Other water immiscible solvents, particularly those which are poor solvents for hydrochloric acid, may also be used. After completion of hydrolysis the aqueous layer, which contains the hydrolysis by-products dissolved therein, is removed and the organic layer is washed several times with fresh water until free of said by-products. A catalytic amount of the composition of this invention is added and the hydrolyzate mixture is partially condensed by heating. The solvents may then be distilled off.

The catalytic amount required will vary depending upon the particular silanes used, the reaction conditions employed and the particular procedure used. Thus it is difficult to set a definite value for the amount of catalyst required, and it will vary depending on the above and other variables, as is well known in the art.

The siloxanes so produced are used as varnishes for the production of laminated products, or they are used in the preparation of molding compositions by blending with conventional fillers such as siliceous fillers, and adding accelerators and lubricants and other uses wherein silicones are normally employed.

Siloxane resins made by employing the compositions of this invention as condensation catalysts have good storage stability and in contrast to heretofore known siloxane resins are and remain light colored when employed in making glass laminates. The arc resistance and dielectric strength of glass laminates employing as bonding materials siloxanes prepared with my compositions as condensation catalysts are significantly better than, and all other mechanical and electrical properties are substantially equivalent to, similar laminates employing heretofore known siloxane resins as bonding materials. Additionally, resins made employing my compositions as condensations catalysts are unlike heretofore known siloxane resins in that they can be successfully used to laminate glass cloths finished with a broad spectrum of finishing agents whereas the heretofore known resins provided good bonding when the glass cloth finish was of a particular type and pH.

The following examples are presented:

EXAMPLE I

There were dissolved 1326 g. (6 moles) of gamma-aminopropyltriethoxysilane in 1326 g. dry methanol. The solution was placed in an ice-water bath, cooled at 25° C. and 696 g. (12 moles) of propylene oxide were added thereto at such a rate that the reaction mass temperature remained at about 30° C. throughout the addition, which required 75 minutes. The reaction mixture was agitated an additional four hours with intermittent cooling as needed to keep its temperature from exceeding 30° C. and then was allowed to react overnight at room temperature without agitation and with no external heating or cooling. There were so obtained 3348 g. of a clear, colorless solution.

EXAMPLE II

There were dissolved 663 g. (3 moles) of gamma-aminopropyltriethoxysilane in 663 g. dry methanol. The solution was cooled to below 30° C. and ethylene oxide was added thereto through a sparger tube immersed below the surface of the solution at such a rate and with cooling as needed to keep the reaction mass temperature from exceeding 35° C. during the addition. After four hours, a total of 317 g. (7.2 moles) ethylene oxide had been added. A mixture consisting of 133 g. (0.6 mole) gamma-aminopropyltriethoxysilane and 133 g. dry methanol was added quickly and mixing was continued an additional four hours during which time the reaction mass temperature was maintained below 30° C. The reaction mixture was stirred overnight at room temperature. The 1909 g. of product so obtained was a clear, colorless solution.

EXAMPLE III

There were dissolved 221 g. (1 mole) of gamma-aminopropyltriethoxysilane in 221 g. dry methanol. The solution was cooled to about 25° C. and 300 g. (2 moles) of redistilled phenyl glycidyl ether were added over a 20 minutes interval. During the addition, the reaction mass temperature was maintained at about 30° C. The reaction mixture was agitated for an additional six hours during which time its temperature was maintained at 25° C. to 35° C. The 742 g. of product so obtained was a clear, substantially colorless solution.

EXAMPLE IV

There were dissolved 205 g. (1 mole) of delta-aminobutylmethyldiethoxysilane in 205 g. dry methanol. The solution was cooled to 20° C. and 116 g. (2 moles) of propylene oxide were added thereto over a six minutes period. The reaction mixture was then agitated for six hours during which time the temperature was maintained at 20° C. to 30° C. The product (526 g.) was a clear, colorless solution.

EXAMPLE V

There were dissolved 221 g. (1 mole) of gamma-aminopropyltriethoxysilane in 221 g. dry methanol and the solution was cooled to 14° C. There were added 58 g. (1 mole) of propylene oxide to said solution with vigorous agitation during a five minutes period and the reaction temperature was then maintained at 20° C. to 30° C. for five hours under agitation and then overnight at room temperature without agitation. The 500 g. of product so obtained was a clear, colorless solution.

EXAMPLE VI

A chlorosilane mixture consisting of 309 g. (2.4 moles) dimethyldichlorosilane, 304 g. (1.2 moles) diphenyldichlorosilane, 538 g. (3.6 moles) methyltrichlorosilane and 1015 g. (4.8 moles) phenyltrichlorosilane was prepared. One half of this mixture was added to an agitated mixture of 6000 ml. isopropyl ether and 2400 ml. water over an approximately two hours interval with the addition rate adjusted and external cooling applied as needed to keep the reaction mass temperature below 40° C. After five minutes additional mixing, agitation was discontinued to permit the reaction mixture to separate into two distinct phases. The water layer was removed and replaced with 2400 ml. fresh water, agitation was restored, the remainder of the chlorosilane mixture was added in substantially the same manner as the first half, and the aqueous phase was again removed. The ether solution was washed with three 2400 ml. portions of water. Ten grams of the alcoholic solution obtained in Example I were added, and the ether was then removed by atmospheric distillation to a pot temperature of 115° C. followed by vacuum distillation to a pot temperature of about 115° C. at about 75 mm. pressure. Vacuum was released, 500 g. toluene were added, and the solution was refluxed at atmospheric pressure with the condensate passing through a water separator until no more water came over. The reaction mixture was cooled and diluted with 100 g. isopropanol. The 1850 g. of varnish so obtained was a clear, almost colorless product having the following properties:

Solids content [1] _____percent__ 68.4
150° C. gel time (with 0.035%, based on solids, of
  choline added) _____seconds__ 29

[1] Non-volatile residue remaining after a 1–2 g. sample of the product was heated, in a 2 inch diameter, shallow ointment tin, for 10 minutes at 160° C.

EXAMPLE VI(A)

For comparison, a second varnish was prepared in the same manner as described in Example VI, except that 5 g. triisopropanolamine were used as the condensation catalyst instead of the 10 g. of the product of Example I. This varnish had a solids content of 66.7% and 150° C. gel time (with 0.035%, based on solids, of choline added) of 93 seconds.

EXAMPLE VII(A)

The varnish of Example VI was diluted to 60% solids with toluene and 0.04% (based on solids) of choline and 0.5% (based on solids) of a toluene solution containing 12% of a 1:1 tricresyl phosphate-benzoyl peroxide paste were added. The catalyzed varnish was charged to the pan of a small laboratory treater and a roll of glass cloth (Hess-Goldsmith HG 28 with a 112/pH 7 finish) was then passed through the varnish and through the 20 foot long drying oven, which was set at 130° C., at the rate of 5 feet/minute. The treated cloth, which contained 40% resin, was cut into 12 inch squares. One-eighth inch thick panels were made in the following manner. Twenty-one plies (squares) were laid up, molded for one hour at 160° C. and 1000 p.s.i., the press cooled, the panel removed and post-cured for 16 hours at 80° C., then one hour at 100° C., then one hour at 150° C., then two hours at 200° C. and finally four hours at 250° C. One-half inch thick panels were made by laminating 87 plies together for two hours at 160° C. and 1000 p.s.i., then after-baking for 40 hours at 80° C., then 24 hours at 100° C., then one hour at 150° C., then two hours at 200° C. and finally four hours at 250° C. The panels had an ivory to very light tan color. Other properties are shown in Table I.

EXAMPLE VII(B)

A second set of 12″ x 12″ x ⅛″ and 12″ x 12″ x ½″ panels were made in the same manner, but using a different glass cloth (Hess-Goldsmith HG 28 with a 136 (Garan) finish). These panels had substantially the same color, mechanical, electrical and other properties as those of VII(A).

EXAMPLE VIII(A)

Panels were prepared as described in Example VII(A) except that the varnish of Example VI(A) was substituted for the varnish of Example VI. The panels were dark brown. Other properties are shown in Table I.

EXAMPLE VIII(B)

An attempt to prepare panels from the varnish of Example VI(A) and the 136 (Garan) finish glass cloth, i.e., as per Example VII(B), gave highly unsatisfactory results. Much difficulty was experienced during the molding operation. Also, the panels were dark brown, delaminated readily, and were of such poor quality that they could not be tested.

Table I lists the properties obtained.

Table I

|  | Panels of Examples VII (A) and (B) | Panels of Example VIII (A) |
|---|---|---|
| Arc Resistance (seconds): Condition D-48/50 | 190-250 | 180-220 |
| Dielectric Breakdown Parallel (KV): | | |
| Condition A | 55-65 | 55-65 |
| Condition D-48/50 | 40-50 | 40-50 |
| Dielectric Strength Perpendicular (Volts/Mil): Condition A | 375-450 | 300-350 |
| Power Factor—1 Megacycle: Condition D-24/23 | 0.003-0.009 | 0.003-0.009 |
| Dielectric Constant—1 Megacycle: Condition D-24/23 | 3.7-3.9 | 3.8-4.0 |
| Volume Resistivity (megohm-cms.): Condition C-96/35/90 | Over $10^7$ | Over $10^7$ |
| Surface Resistance (megohms): Condition C-96/35/90 | Over $10^4$ | Over $10^4$ |
| Flexural Strength (p.s.i.): | | |
| At 23° C | 24,000-26,000 | 24,000-26,000 |
| At 200° C | 9,000-10,000 | 7,000-9,000 |
| Izod Impact Strength (ft. lb./in. notch): Condition D-48/50 | 8-12 | 6.5-10 |
| Water Absorption (percent): Condition E-1/105 followed by Condition D-24/23 | 0.05-0.09 | 0.05-0.10 |
| Bond Strength (lbs.): | | |
| Condition A | 750-850 | 750-850 |
| Condition D-48/50 | 700-800 | 700-800 |

The above results were determined by the test methods described in Federal Specification LP-406 B. The tests for Bond Strength are performed on the ½ inch thick panels. The other tests cited are performed on the ⅛ inch thick panels.

Condition A=as molded;
Condition C-96/35/90=after 96 hours at 35° C. and 90% relative humidity;
Condition D-24/23=after 24 hours immersion in water at 23° C.;
Condition D-48/50=after 48 hours immersion in water at 50° C.; and
Condition E-1/105=after 1 hour in 105° C. oven.

In Table II are tabulated additional examples, carried out as described in Example VI, wherein different condensation catalysts were employed. All of the resins were suitable for laminating purposes.

Table II

| Example | Condensation Catalyst from Example | Percent Non-Volatiles | Gel Time, Sec. |
|---|---|---|---|
| IX | II | 72.6 | 23 |
| X | III | 65.1 | 30 |
| XI | I | 64.8 | 35 |
| XII | IV | 65.5 | 48 |
| XIII | V | 65.3 | 560 |

The gel time was determined at 150° C., using choline as catalyst.

What is claimed is:

1. The process for preparing organopolysiloxane resins which comprises (1) mixing together (a) at least one member selected from the class consisting of hydrolysis products of organosilicon compounds represented by the formula:

$$R_n'''SiX_{4-n}$$

where R''' is selected from the class consisting of monovalent hydrocarbon groups free from aliphatic unsaturation and monovalent halogen-substituted hydrocarbon groups free from aliphatic unsaturation, X is selected from the class consisting of halogen and alkoxy and $n$ is an integer from 0 to 3 and (b) a condensation catalyst consisting of the reaction product in an organic solvent of a monomeric monoepoxide and aminoalkylsilicon compounds selected from the class consisting of (a) silanes represented by the formula:

(A) 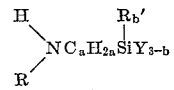

(b) siloxane homopolymers consisting essentially of units represented by the formula:

(B) 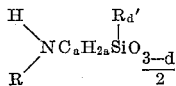

and (c) siloxane copolymers consisting essentially of units of Formula B hereinabove and units represented by the formula:

(C) 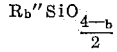

wherein, in Formulas A, B and C, R is selected from the class consisting of hydrogen, monovalent hydrocarbon groups free from aliphatic unsaturation and

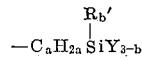

groups, R' and R'' are monovalent hydrocarbon groups free from aliphatic unsaturation, Y is an alkoxy group, $a$ is an integer from 1 to 15, $b$ is an integer from 0 to 3 and $d$ is an integer from 0 to 2 and (2) heating the mixture to condense said product.

2. The process for preparing organopolysiloxane resins which comprises (1) mixing together (a) at least one member selected from the class consisting of hydrolysis products of organosilicon compounds represented by the formula:

$$R_n'''SiX_{4-n}$$

wherein R''' is selected from the class consisting of monovalent hydrocarbon groups free from aliphatic unsaturation and monovalent halogen-substituted hydrocarbon groups free from aliphatic unsaturation, X is selected from the class consisting of halogen, and alkoxy and $n$ is an integer from 0 to 3 and (b) a condensation catalyst consisting of the reaction product in a low molecular weight aliphatic alcohol solvent of a monomeric monoepoxide and an aminosilane represented by the formula:

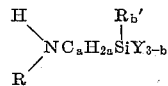

wherein R is a member selected from the class consisting of hydrogen, monovalent hydrocarbon groups free from aliphatic unsaturation and

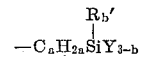

groups, R' is a monovalent hydrocarbon group free from aliphatic unsaturation, Y is an alkoxy group, $a$ is an integer from 3 to 4 and $b$ is an integer from 0 to 3 and (2) heating the mixture to condense said product.

3. The process of claim 2 wherein the monoepoxide is propylene oxide and the aminoalkylsilane is gamma-aminopropyltriethoxysilane.

4. The process of claim 2 wherein the monoepoxide is ethylene oxide and the aminoalkylsilane is gamma-aminopropyltriethoxysilane.

5. The process of claim 2 wherein the monoepoxide is phenyl glycidyl ether and the aminoalkylsilane is gamma-aminopropyltriethoxysilane.

6. The process of claim 2 wherein the monoepoxide is propylene oxide and the aminoalkylsilane is delta-aminobutylmethyldiethoxysilane.

7. The process for preparing an organopolysiloxane resin which comprises mixing the hydrolysis product of a mixture of dimethyldichlorosilane, diphenyldichlorosilane, methyltrichlorosilane, and phenyltrichlorosilane together with a condensation catalyst consisting of the reaction product in methanol of gamma-aminopropyltriethoxysilane and propylene oxide, and heating the mixture to condense said hydrolysis product.

References Cited by the Examiner

UNITED STATES PATENTS

| | | | |
|---|---|---|---|
| 2,486,162 | 10/1949 | Hyde | 260—46.5 |
| 2,819,245 | 1/1958 | Shorr | 260—46.5 |
| 2,881,184 | 4/1959 | Pike | 260—46.5 |
| 2,907,782 | 10/1959 | Pike | 260—46.5 |
| 2,920,095 | 1/1960 | Jex et al. | 260—46.5 |
| 2,921,950 | 1/1960 | Jex et al. | 260—46.5 |
| 2,930,809 | 3/1960 | Jex et al. | 260—46.5 |
| 2,942,019 | 6/1960 | Pike et al. | 260—46.5 |
| 2,943,103 | 6/1960 | Jex et al. | 260—46.5 |
| 2,949,434 | 8/1960 | Bailey et al. | 260—46.5 |
| 2,955,127 | 10/1960 | Pike | 260—46.5 |
| 2,957,899 | 10/1960 | Black et al. | 260—46.5 |
| 3,032,576 | 5/1962 | Morehouse | 260—46.5 |

OTHER REFERENCES

"Silicones," Meals et al., Reinhold Publishing Co., New York, (1959), pages 98–113.

LEON J. BERCOVITZ, *Primary Examiner.*

M. STEARMAN, H. N. BURSTEIN, WILLIAM H. SHORT, *Examiners.*